United States Patent [19]
Bernhardt

[11] Patent Number: 5,403,476
[45] Date of Patent: Apr. 4, 1995

[54] ARRANGEMENT FOR REMOVING IMPURITIES FROM GROUND WATER

[75] Inventor: Bruno Bernhardt, Reutlingen, Germany

[73] Assignee: IEG Industrie-Engineering GmbH, Reutlingen, Germany

[21] Appl. No.: 69,939

[22] Filed: May 28, 1993

[30] Foreign Application Priority Data

May 29, 1992 [DE] Germany .......................... 42 17 825.8
Aug. 20, 1992 [DE] Germany .......................... 42 27 570.9

[51] Int. Cl.$^6$ ............................................. C02F 1/74
[52] U.S. Cl. ................................... 210/170; 210/220; 210/416.1; 166/67; 166/105.5; 166/106; 166/265
[58] Field of Search ............ 210/170, 220, 188, 416.1, 210/747; 166/67, 105.5, 106, 265

[56] References Cited

U.S. PATENT DOCUMENTS

| | | | |
|---|---|---|---|
| 4,766,957 | 8/1988 | McIntyre | 166/106 |
| 4,928,771 | 5/1990 | Vandevier | 166/106 |
| 4,930,394 | 8/1990 | Bernhardt et al. | 210/170 |
| 5,015,370 | 5/1991 | Fricano | 210/170 |
| 5,082,053 | 1/1992 | Bernhardt | 166/106 |
| 5,095,975 | 3/1992 | Bernhardt | 166/106 |
| 5,116,163 | 5/1992 | Bernhardt | 210/170 |
| 5,143,606 | 9/1992 | Bernhardt | 210/170 |
| 5,171,103 | 12/1992 | Bernhardt | 166/267 |
| 5,171,104 | 12/1992 | Bernhardt | 210/170 |

FOREIGN PATENT DOCUMENTS 3811962 2/1989 Germany .
4001011 12/1990 Germany .
3931011 3/1991 Germany .

Primary Examiner—Christopher Upton
Attorney, Agent, or Firm—Michael J. Striker

[57] ABSTRACT

An arrangement for removing impurities from ground water and surrounding ground region has a wall shaft driven to a contaminated region and provided with at least locally permeable well shaft, a separating wall subdividing the well shaft into two well shaft regions which are sealed from one another, a device for removing impurities arranged in the well shaft so that ground water passes through the device, a tube provided with a feed pump and extending through the separating wall, and an opening provided in one of the well shaft regions to communicate the one well shaft region with the tube, wherein the tube has a tube portion extending through the opening and accommodating an additional feed pump.

15 Claims, 4 Drawing Sheets

ARRANGEMENT FOR REMOVING IMPURITIES FROM GROUND WATER

BACKGROUND OF THE INVENTION

The present invention relates to an arrangement for removing impurities from ground water.

More particularly, it relates to an arrangement for removing impurities, in particular volatile impurities from the ground water and ground region through which it passes, by means of circulation of ground water in the contaminated region.

The arrangements of the above mentioned general type are known in the art. In the known arrangement the circulation is performed through a well shaft which is driven to the region of contaminated ground water and has at least locally permeable shaft wall and a device for removing the impurities. The well shaft is subdivided by at least one separating wall into mutually sealed well shaft regions, and a pipe provided with a feed pump extends through the separating wall. While the above described arrangement efficiently performs its intended functions, it is to be understood that it can be further improved.

SUMMARY OF THE INVENTION

Accordingly, it is an object of the present invention to provide an arrangement for removing impurities from ground water, which is formed so that it can be better adjusted to conditions of different applications of the arrangement.

In keeping with these objects and with others which will become apparent hereinafter, one feature of the present invention resides, briefly stated, in an arrangement for removing impurities from ground water in which the tube in at least one region of the well shaft communicates through an opening with an associated well chamber, and an additional feed pump is arranged in a tube portion which extends through the opening.

Due to the opening, the tube is practically subdivided into two portions. Because of this division and because of the arrangement of the feed pumps in both thusly formed tube portions, two separate circulations which in particular overlap one another are provided. Therefore, in the region of the cleaning device always throughflow volumes which are optimal for the device are provided, regardless of the intensity of the circulating volumes in the ground region which surrounds the well shaft and also in other well shaft portions. For example, in unfavorable ground conditions with a slow ground water flow through the surrounding ground region, an active ground water circulation in the cleaning region of the arrangement can be obtained.

In the arrangement designed in accordance with the present invention the tube opening can be formed in different ways. Preferably, the tube opening can be formed by subdividing the tube into two portions at the subdivision location. Thereby the tube can have different diameters at both sides of the subdivision. The feed pumps arranged in both tube portions can include at least one feed pump which is reversible, and the feed pumps can be formed so as to provide different outputs. With this approach the flow direction in the circulations can be selected on the one hand, and the circulating volumes created in both circulations can be finely adjusted.

The device for removing the impurities can be also formed in different ways. It has a throughflow chamber for ground water to be cleaned, in which the upper tube portion opens with its Upper edge. The throughflow chamber can be for example a part of a filtering device. It can be also a part of a gasifying device which by producing a negative pressure, supplies for example fresh air from a nozzle body located in the well shaft under the ground water level, through the ground water.

In accordance with a further feature of the present invention, a further improvement of the control of completely or partially different circulations is obtained when the well shaft region accommodating the tube with the connection opening can communicate with a neighboring well shaft region through a separating wall opening, and a valve can close the opening, so as to provide a pressure-dependent flow compensation between two neighboring well shaft regions.

The novel features of the present invention are set forth in particular in the appended claims. The invention itself however both as to its construction and its manner of operation will be best understood from the following description of preferred embodiments which is accompanied by the following drawings.

DESCRIPTION OF PREFERRED EMBODIMENTS

Figure 1:
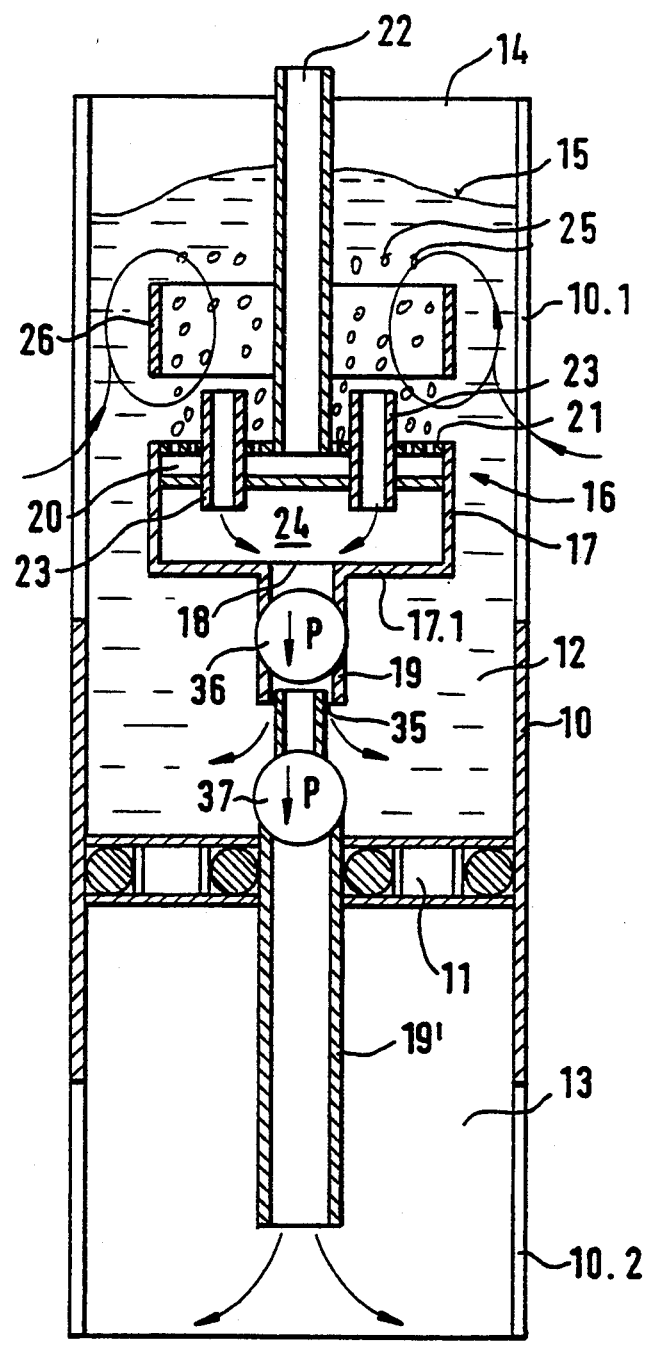
FIGS. 1, 2 and 3 are views showing first, second and third embodiments of an arrangement for removing impurities from ground water in accordance with the present invention, in which a device for removing impurities is formed as a gasifying device.

An arrangement for removing impurities from ground water in accordance with the present invention has a well tube 10 which is inserted into a drilled shaft and identified with reference numeral 10 in all figures. A part of the well tube 10 is shown in the drawings. The well tube 10 has two portions 10.1 and 10.2 with a water permeable wall. A separating wall 11 tightly inserted into the vertically,extending well tube between the water permeable portions 10.1 and 10.2 subdivides the well tube into an upper cleaning region 12 and a lower collecting region 13.

Figure 2:
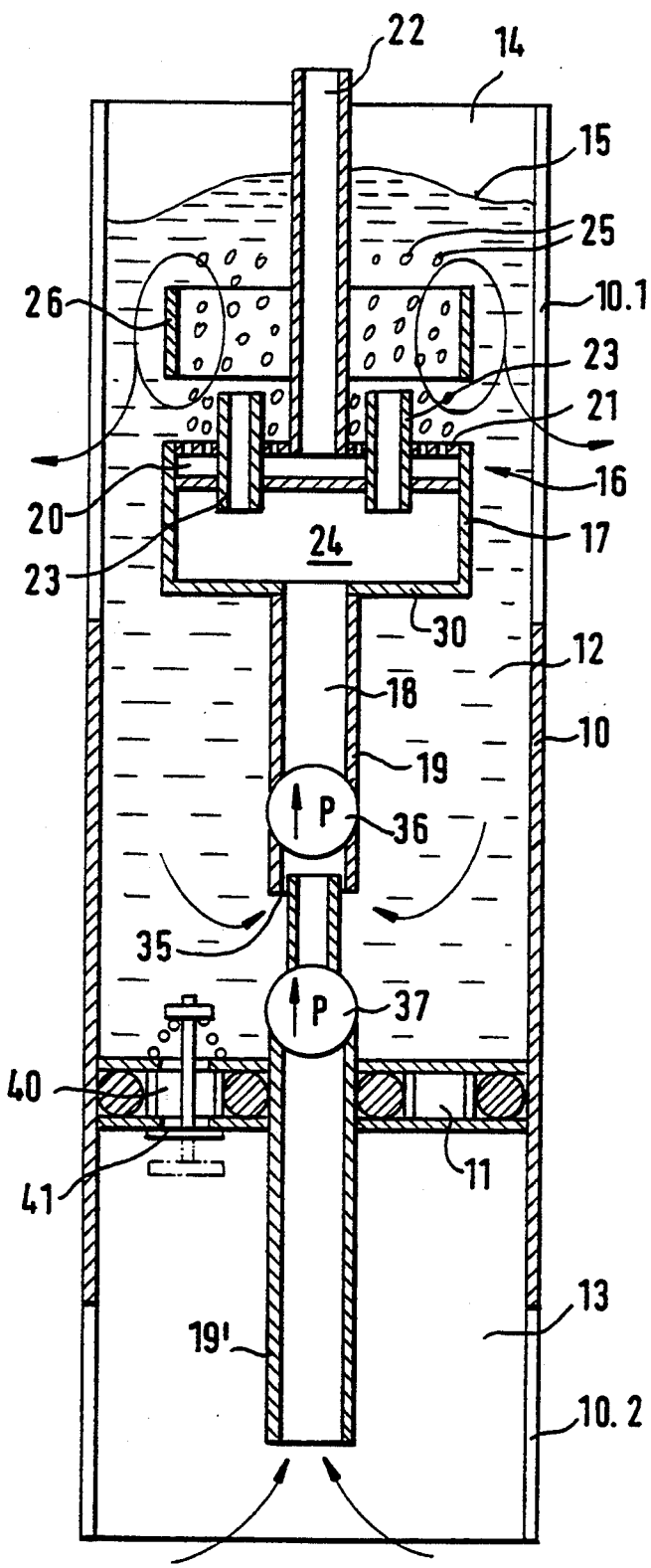
Figure 3:
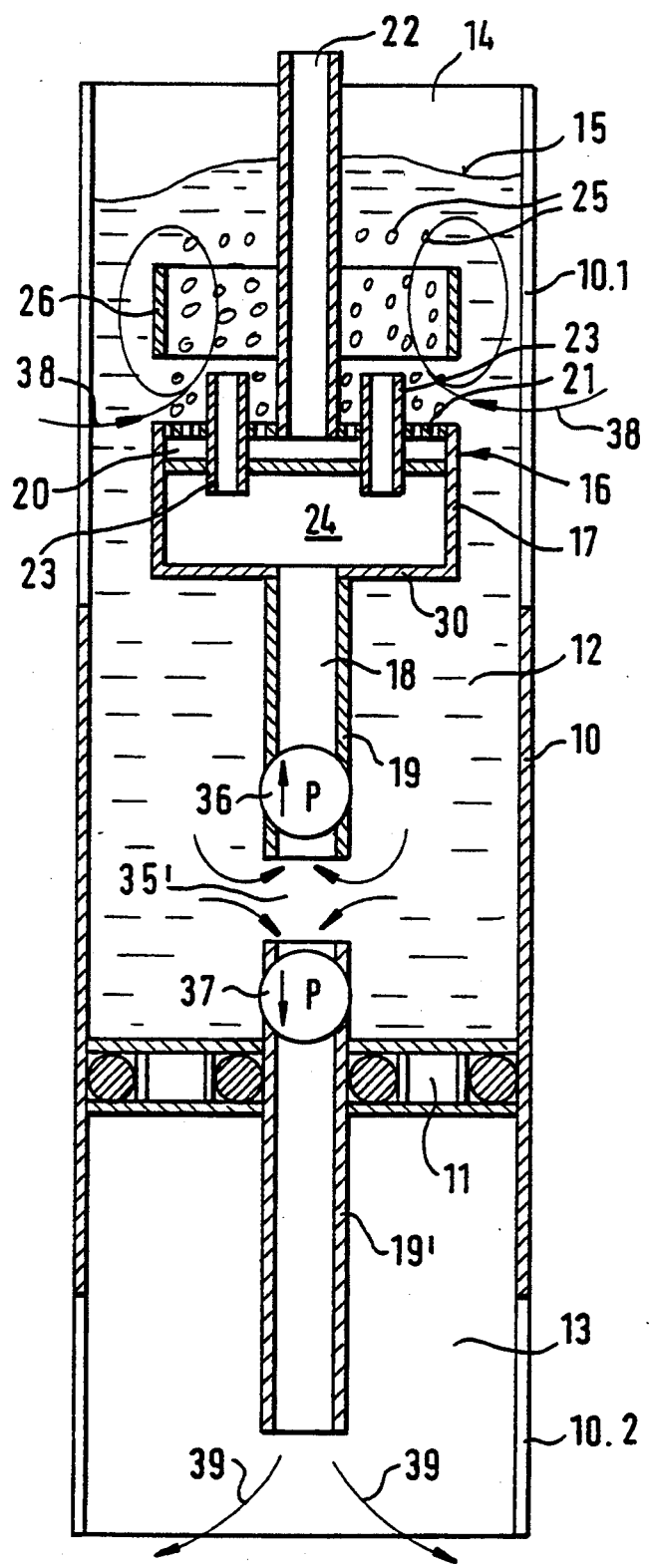

In the embodiments shown in FIGS. 1-3, a not shown fan produces a negative pressure in an upper free region 14 of the well tube. Thereby a raise of the ground water level 15 takes place inside the well tube.

In the first three embodiments shown in these figures the arrangement in accordance with the present invention has a device for removing the impurities, which is arranged in the cleaning region 12 of the well tube under the ground water level 15 raised by the negative pressure and is formed as a gas treatment device 16. The device has a box-shaped cylindrical insert housing 17 which has a bottom wall 17.1 limiting a throughflow chamber 24 and provided with a central opening 18. A first upper portion 19 of a central pipe extends downwardly from the opening 18. A gas chamber 20 is formed on the upper end of the insert housing 17 and is limited from above by a cover wall of the insert housing. This cover wall is formed as a nozzle plate 2. The gas chamber 20 communicates with a gas source, for example outside air, through a central upwardly and outwardly extending connecting pipe 22. A tubular part 23 extends upwardly through the gas chamber 20 and provides communication of the throughflow chamber 24 of the insert housing 17 in the upper part of the cleaning region 12, where a flow guiding ring 26 is arranged concentrically to the connecting pipe 22. The tubular part 23 can be provided with gas inlet openings in the region of the gas chamber 20, as for example in the arrangement disclosed in the DE-PS 38 11 962 describing the objectives and operation of the tubular parts.

A feed pump 36 is arranged in the upper tube portion 19. A second and lower tube portion 19' follows the upper tube portion 19 and has a smaller diameter at its upper end as shown in FIG. 1, so as to form with the lower end of the upper tube part a ring-shaped opening 35. A feed pump 37 is arranged in the lower tube portion 19', and the latter extends through a corresponding central opening in the separating wall 11 into the collecting region 13 of the well tube 10. The purpose of the cleaning device is to aspirate gas introduced into the gas chamber 20 under the action of negative pressure provided in the upper well tube region 14, through the contaminated ground water in the cleaning region 12. Thereby volatile impurities are removed from the ground water under the action of gas bubbles 25 formed during the above described aspiration.

With substantial negative pressure in the well tube region 14 a very strong movement of the ground water is caused in the upper part of the cleaning region 12. Due to the guiding ring 26, an orderly circulation of the ground water which is strongly moved above the nozzle plate 2 is produced and moves the water repeatedly in the region of the raising gas bubbles. The raising gas bubbles create a so-called airlift effect which is used for producing a ground water circulation through the ground layers which surround the drilled hole. Depending on the feeding direction of the pumps 36 and 37 the ground water flows from the cleaning region 12 through the permeable wall portion 10.1 of the well tube 10 outwardly into the surrounding ground region and vice versa, then it flows through the lower liquid permeable wall portion 10.2 of the well tube 10 into the collecting region 13, and from there flows through the tube 19 into the insert housing 17, and finally from there it flows through the tubular member 23 upwardly into the cleaning region 12 or vice versa.

FIG. 1 shows an inventive arrangement which is used in inclinations, in which the ground water circulation is impeded by dense ground region. The ground water is supplied by the feed pump 36 through the wall portion 10.1 into the cleaning region 12. A part of the ground water which flows through the throughflow chamber 24 flows through the ring shaped opening 35 back into the cleaning region 12 and thereby gasified many times before it reaches the collecting region 13 through the lower tube portion 19' for a further discharge into the surrounding ground region.

The arrangement in accordance with the embodiment of FIG. 2 is utilized in ground regions in which the ground water circulation in the lower collecting region 13 of the well shaft is too low for obtaining a high efficiency of the arrangement. In this case the feed pump 36 aspirates ground water from the lower part of the cleaning region 12 through the ring gap 35 in the tube 19' and transports it upwardly. The water from the collecting region 13 is continuously transported by the feed pump 37, so that an active ground water circulation is maintained in the cleaning region 12. A one-way valve with an adjustable spring-biased valve plate 41 in the throughgoing opening 40 of the separating wall 11 regulates the negative pressure in the collecting region. In particular, when a predetermined negative pressure is exceeded, the opening 40 is released and a communication of the collecting region 13 with the cleaning region 12 is established.

In the embodiment of FIG. 3 a greater distance between the tube portiobs 19 and 19' and thereby a greater opening 35' in the cleaning region 12 are provided. The feed pump 36 arranged in the upper tube portion 19' is used to transport water upwardly, while the feed pump 37' arranged in the lower tube portion 19' is provided for transporting the ground water downwardly. The arrangement of FIG. 3 provides a reverse of the ground water circulation produced in the surrounding area of the well shaft. In contrast to the embodiment of FIGS. 1 and 2, the ground water under the action of suction produced by both pumps 36' and 37' is aspirated in correspondence with the direction of the arrows 38 into the cleaning region 12 and there under the action of the negative pressure and also of the feed pump 36' is maintained in circulation. A part of this water which is circulated and already subjected to cleaning and also a part of contaminated ground water are transported by the pump 37' downwardly through the separating wall 11 into the collecting region 13. The ground water can flow from the collecting region through the water permeable shaft wall 10.2 into the surrounding ground region as indentified with the arrow 39 in FIG. 3.

Figure 4:
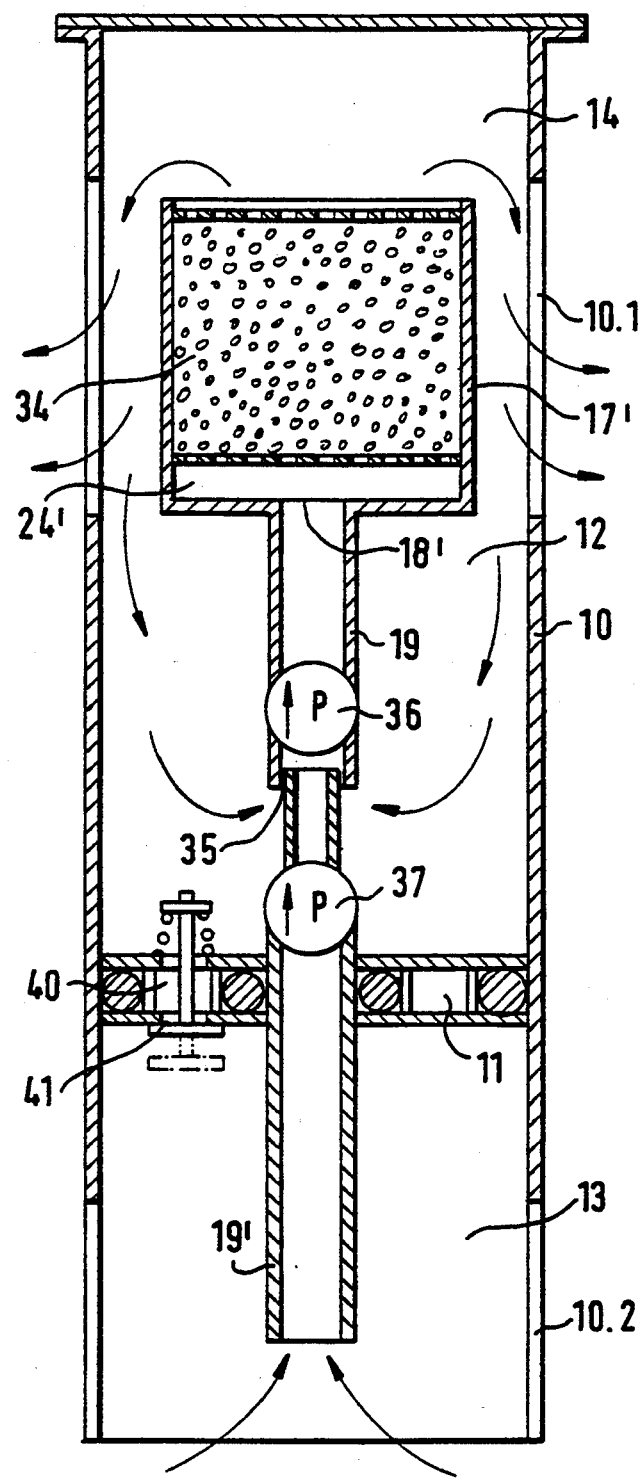
FIG. 4 is a view showing an arrangement for removing impurities from ground water, which substantially corresponds to the arrangement shown in FIG.2, but in which the device for removing impurities is formed as a filtering device.

The arrangement in accordance with the embodiment of FIG. 4 differs from the arrangement of FIG. 2 in that, instead of the gasifying device with the insert body 17, an insert body 17' of a filtering device is provided. A filter body or a particulate filtering filler 34 is located in the interior of the insert body 17'. The upper tube portion 19 opens through the bottom opening 18' directly into the tube insert 17' which forms the throughflow chamber 24'. No negative pressure is produced in the upper region 14 of the well tube 10.

In the arrangements in accordance with all shown embodiments two circulations of the ground water are formed. In particular, a main circulation is performed through the surrounding ground region and through both well tube regions 12 and 13, while an additional inner circulation is performed in the well tube through the cleaning device arranged in it. On the other hand, a further substantial separation of the circulations can be obtained when in accordance with the embodiment of FIG. 3 the feed pumps operate with different feeding directions.

It will be understood that each of the elements described above, or two or more together, may also find a useful application in other types of constructions differing from the types described above.

While the invention has been illustrated and described as embodied in an arrangement for cleaning impurities from ground water, it is not intended to be limited to the details shown, since various modifications and structural changes are possible without departing in any way from the spirit of the present invention.

Without further analysis, the foregoing will so fully reveal the gist of the present invention that others can, by applying common knowledge, readily adapt it for various applications without omitting features which, from the standpoint of prior art, fairly constitute essential characteristics of the generic or specific aspects of this invention.

What is claimed as new and desired to be protected by Letters Patent is set forth in the appended claims.

1. An arrangement for removing impurities from ground water and a surrounding ground region by producing a ground water circulation in a contaminated region, the arrangement comprising a first at least locally permeable shaft wall portion and a second at least locally permeable shaft wall portion connected to each other to form a well shaft extending through the contaminated region; a separating wall subdividing the well shaft into two well shaft regions, each of said well shaft regions containing one of said at least locally permeable well shaft wall portions; a device for removing impurities comprising first pump means so that ground water passes through said device and located in said well shaft; and a tube passing through said separating wall and connecting said well shaft regions, said tube being provided with second pump means for conveying said ground water between said well shaft regions.

2. An arrangement as defined in claim 1, wherein at least one of said feed pumps has a reversible feeding direction.

3. An arrangement as defined in claim 1, wherein said feed pumps are independently adjustable with regard to a feeding output of each of said feed pumps.

4. An arrangement as defined in claim 1, wherein said separating wall is provided with an opening for additional communication between said well shaft region and further comprising a valve arranged for closing said opening in said separating wall.

5. An arrangement as defined in claim 1, wherein said tube includes two tube portions one of said portions being connected to said device for removing impurities, and wherein one of said pump means is provided in each of said tube portions and said tube is provided with an opening into one of said two well shaft regions, said opening being located between said tube portions.

6. An arrangement as defined in claim 5, wherein said device for removing impurities has a throughflow chamber, said tube portions including an upper tube portion which opens upwardly into said throughflow chamber of said device for removing impurities.

7. An arrangement as defined in claim 6, wherein said throughflow chamber of said device for removing impurities forms a part of a filtering device.

8. An arrangement as defined in claim 6, further comprising a gasifying device including a nozzle body forming means so that gas under negative pressure is supplied from said nozzle body through the ground water and said gasifying device includes said throughflow chamber.

9. An arrangement as defined in claim 8, wherein said nozzle body is located in said well shaft under a level of the ground water.

10. An arrangement as defined in claim 8, wherein said device for removing impurities has an insert housing located in said well shaft and forming said throughflow chamber.

11. An arrangement as defined in claim 10, wherein said well shaft has a cleaning region, said through-flow chamber being formed below said nozzle body and communicating with said cleaning region of said well shaft.

12. An arrangement as defined in claim 11, wherein said throughflow chamber of said device for removing impurities communicates with said cleaning region of said well shaft through said nozzle body.

13. An arrangement as defined in claim 11 wherein said device for removing impurities has liquid passages which lead toward said nozzle body, said throughflow chamber communicating with said cleaning region through said throughflow passages.

14. An arrangement as defined in claim 5, wherein one of said two tube portions is separate from another of said two tube portions thus forming said opening.

15. An arrangement as defined in claim 5, wherein said two tube portions have different diameters.

* * * * *